United States Patent
Fisher

(10) Patent No.: US 7,565,283 B2
(45) Date of Patent: Jul. 21, 2009

(54) METHOD AND SYSTEM FOR CONTROLLING POTENTIALLY HARMFUL SIGNALS IN A SIGNAL ARRANGED TO CONVEY SPEECH

(75) Inventor: Michael John Amiel Fisher, Cremorne (AU)

(73) Assignee: Hearworks Pty Ltd., East Melbourne, Victoria (AU)

( * ) Notice: Subject to any disclaimer, the term of this patent is extended or adjusted under 35 U.S.C. 154(b) by 191 days.

(21) Appl. No.: 10/494,346

(22) PCT Filed: Mar. 13, 2003

(86) PCT No.: PCT/AU03/00301

§ 371 (c)(1),
(2), (4) Date: May 23, 2005

(87) PCT Pub. No.: WO03/077236

PCT Pub. Date: Sep. 18, 2003

(65) Prior Publication Data

US 2005/0228647 A1   Oct. 13, 2005

(30) Foreign Application Priority Data

Mar. 13, 2002   (AU) .......................... PS1029

(51) Int. Cl.
*G10L 21/02* (2006.01)
*G10L 11/02* (2006.01)
*H03G 11/00* (2006.01)
*H04B 15/00* (2006.01)

(52) U.S. Cl. .............. 704/205; 704/210; 704/225; 330/135; 381/94.3

(58) Field of Classification Search ........... 704/205, 704/206, 207, 210, 215, 225, 226, 227, 228; 381/94.3, 94.5, 94.8; 330/135
See application file for complete search history.

(56) References Cited

U.S. PATENT DOCUMENTS

| | | | | |
|---|---|---|---|---|
| 4,112,384 A * | 9/1978 | Buchberger | ................ | 330/141 |
| 4,139,825 A * | 2/1979 | Inoue et al. | ................ | 330/260 |
| 4,628,529 A * | 12/1986 | Borth et al. | ................ | 381/94.3 |
| 5,457,769 A * | 10/1995 | Valley | ..................... | 704/210 |
| 5,459,814 A | 10/1995 | Gupta et al. | | |
| 5,506,885 A | 4/1996 | Hamilton | | |
| 5,524,148 A * | 6/1996 | Allen et al. | ................ | 379/391 |
| 5,708,754 A * | 1/1998 | Wynn | ..................... | 704/219 |
| 5,742,694 A * | 4/1998 | Eatwell | ................... | 381/94.2 |
| 5,907,823 A * | 5/1999 | Sjoberg et al. | ............ | 704/225 |
| 5,970,446 A | 10/1999 | Goldberg et al. | | |
| 6,006,176 A * | 12/1999 | Hayata | .................... | 704/214 |
| 6,097,820 A * | 8/2000 | Turner | .................... | 381/94.3 |
| 6,169,971 B1 * | 1/2001 | Bhattacharya | ............. | 704/225 |

(Continued)

FOREIGN PATENT DOCUMENTS

EP   0674415   9/1995

(Continued)

*Primary Examiner*—Martin Lerner
(74) *Attorney, Agent, or Firm*—Merchant & Gould P.C.

(57) ABSTRACT

A method and system for controlling potentially harmful signals in a signal arranged to convey speech is described. The method includes the steps of establishing characteristics of the signal when it is conveying speech; monitoring the signal; and controlling the signal relative to the established characteristics.

36 Claims, 15 Drawing Sheets

U.S. PATENT DOCUMENTS

| | | | |
|---|---|---|---|
| 6,185,298 B1 * | 2/2001 | Hashimoto | 379/390.01 |
| 6,363,343 B1 * | 3/2002 | Horos | 704/225 |
| 6,420,986 B1 * | 7/2002 | Shahaf et al. | 341/139 |
| 6,453,289 B1 * | 9/2002 | Ertem et al. | 704/225 |
| 6,591,234 B1 * | 7/2003 | Chandran et al. | 704/225 |
| 6,658,380 B1 * | 12/2003 | Lockwood et al. | 704/215 |
| 6,862,567 B1 * | 3/2005 | Gao | 704/228 |
| 7,120,579 B1 * | 10/2006 | Licht | 704/225 |
| 7,206,418 B2 * | 4/2007 | Yang et al. | 381/92 |
| 2002/0041678 A1 * | 4/2002 | Basurg-Ertem et al. | 379/406.01 |

FOREIGN PATENT DOCUMENTS

| | | |
|---|---|---|
| EP | 0674415 A1 | 9/1995 |
| EP | 0727769 B1 | 4/1996 |
| EP | 0727769 | 11/2001 |
| IT | 1266569 | 1/1997 |
| WO | 94/18756 | 8/1994 |
| WO | WO 94/18756 A1 | 8/1994 |

* cited by examiner

METHOD AND SYSTEM FOR CONTROLLING POTENTIALLY HARMFUL SIGNALS IN A SIGNAL ARRANGED TO CONVEY SPEECH

TECHNICAL FIELD

This invention relates to a method and system for controlling potentially harmful signals in a signal conveying speech.

BACKGROUND TO THE INVENTION

Speech communication systems transmit a signal which may contain non-speech signals as well as speech signals. These non-speech signals include noises intentionally made by telephony equipment such as fax machines, and also unwanted noises of indeterminate origin such as squeals and crackles. When converted to sound these non-speech signals may be harmful to a listener such as by causing a listener to experience an acoustic shock. The potential for an acoustic shock is increased when the receiving electro-acoustic transducer is close to the listener's ear such as with a telephone handset. The risk of an acoustic shock is further increased if the receiving electro-acoustic transducer cannot be quickly removed from the ear such as with a headset or headphone. Examples of these speech communications systems are the fixed and mobile telephone system, two-way radios, dictation machines, VoIP systems, hearing aids and intercoms.

There is reason to believe that the phenomenon of acoustic shock adversely affects operatives working in such organisations as call centres, receptionists, and operatives in any area where telecommunication apparatus are used. As well as experiencing pain and discomfort during and for some days after the exposure, some call centre operatives report symptoms of headaches, nausea, tenseness and hypersensitivity to sounds lasting for several days or weeks. In some cases symptoms have been reported to last for several years.

There have been several approaches to minimising the occurrence and intensity of acoustic shocks through means of controlling the acoustic level presented to the listener. These approaches include peak clipping and compression limiting.

Peak clippers control the acoustic level presented to a listener by preventing the voltage applied to the receiving electro-acoustic transducer from exceeding a given magnitude. Peak clipping may be implemented by placing a pair of diodes in reverse polarity to each other across the coil of the receiving electro-acoustic transducer. The frequency content of the acoustic signal resulting from this peak clipping is a function of the receiving electro-acoustic transducer's response. Peak clipping may also be implemented within the circuit that provides the signal to the receiving electro-acoustic transducer. It is possible for this circuitry to provide filtering of the clipped signal prior to applying it to the receiving electro-acoustic transducer. In this case the frequency content of the acoustic signal resulting from this peak clipping is a function of both the filter and the receiving electro-acoustic transducer's response.

Compression limiters control the acoustic level presented to a listener by providing reduced amplification of the signal to be applied to the receiving electro-acoustic transducer when it has a high amplitude. Compression limiting may be implemented by reducing the gain of an amplifier through which the signal passes by the amount the envelope of the input signal exceeds a given threshold. This gain reduction may be performed on a broad band or frequency specific manner and may be followed by filtering. The frequency content of the acoustic signal resulting from compression limiting is a function of the post compression limiting filtering and the receiving electro-acoustic transducer's response. Peak clippers may be used in conjunction with compression limiting.

Both peak clippers and compression limiters can adversely affect the quality and intelligibility of speech. A balance exists between the acoustic protection these devices provide and the effect they have on the quality and intelligibility of speech. As these devices only control the voltage applied to the receiving electro-acoustic transducer any variation in the sensitivity of the receiving electro-acoustic transducer will result in a variation in the resulting sound level presented to the listener. Users of devices are known to interchange transducers. If the user substitutes the transducer for one of higher sensitivity, harmful signal levels may still be presented to the user. The susceptibility to an acoustic shock varies from individual to individual and with the state of the individual. Limiting at a fixed level may offer sufficient protect for a given individual at a given point in time although at other times or for other individuals this level may result in insufficient protection, insufficient speech loudness or speech distortion. Reports of acoustic shock injuries occurring to users of highly controlled limiters indicate that the perceived frequency specific loudness of a signal plays a major part in the causing the injury.

SUMMARY OF THE INVENTION

In a first aspect the present invention provides a method of controlling potentially harmful signals in a signal arranged to convey speech, the method including the steps of: analysing the signal to determine features of the signal; analysing the signal to determine if it is conveying a speech signal; if the signal is determined to be conveying a speech signal then establishing characteristics of the signal based on the analysed features of the signal; and if a feature of the signal exceeds a corresponding established characteristic then controlling the signal to reduce the excess.

These features may include any measurable feature including the amplitude of the signal, the power of the signal, the loudness of the signal, the amplitude of the signal in particular frequency bands, the power of the signal in particular frequency bands, and the specific loudness of the signal; all of the aforementioned being measured on a time dependent basis.

By the above method, the signal is controlled relative to the characteristics previously determined from the signal when it was conveying speech. If the signal exhibits features outside the established characteristics then it is controlled. Hence, reduction in the amplitude of potentially harmful signals may be provided. Further, control of potentially harmful signals may be provided independent of the sensitivity of the specific sound reproduction equipment employed by the user.

Optionally, the characteristics are re-established at pre-determined intervals. The characteristics of the signal can change over time. This could be due to many factors including a change in the person speaking. Regularly re-establishing the characteristics of the signal allows the method to adapt to changes in conditions in the signal. This is because the signal is being controlled relative to recent analysis of the signal.

Optionally, the method further includes the step of providing pre-determined established characteristics. These may be stored in memory so that there are characteristics that can be used upon initiation of the method, such as when initiating a software program that is arranged to conduct the method. Preferably, the memory is a non-volatile memory.

In a second aspect the present invention provides a system for controlling potentially harmful signals in a signal arranged to convey speech, the system including: analysing means for analysing the signal to determine features of the signal; analysing means for analysing the signal to determine if it is conveying a speech signal; establishing means for establishing characteristics of the signal based on the analysed features of the signal if the signal is determined to be conveying a speech signal; and control means for controlling the signal to reduce the excess if a feature of the signal exceeds a corresponding established characteristic.

In a third aspect the present invention provides a computer software program providing instructions for controlling a computing system to carry out a method according to the first aspect of the invention.

In a fourth aspect the present invention provides a computer readable medium providing a computer software program according to the third aspect of the invention.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENT

Figure 1:
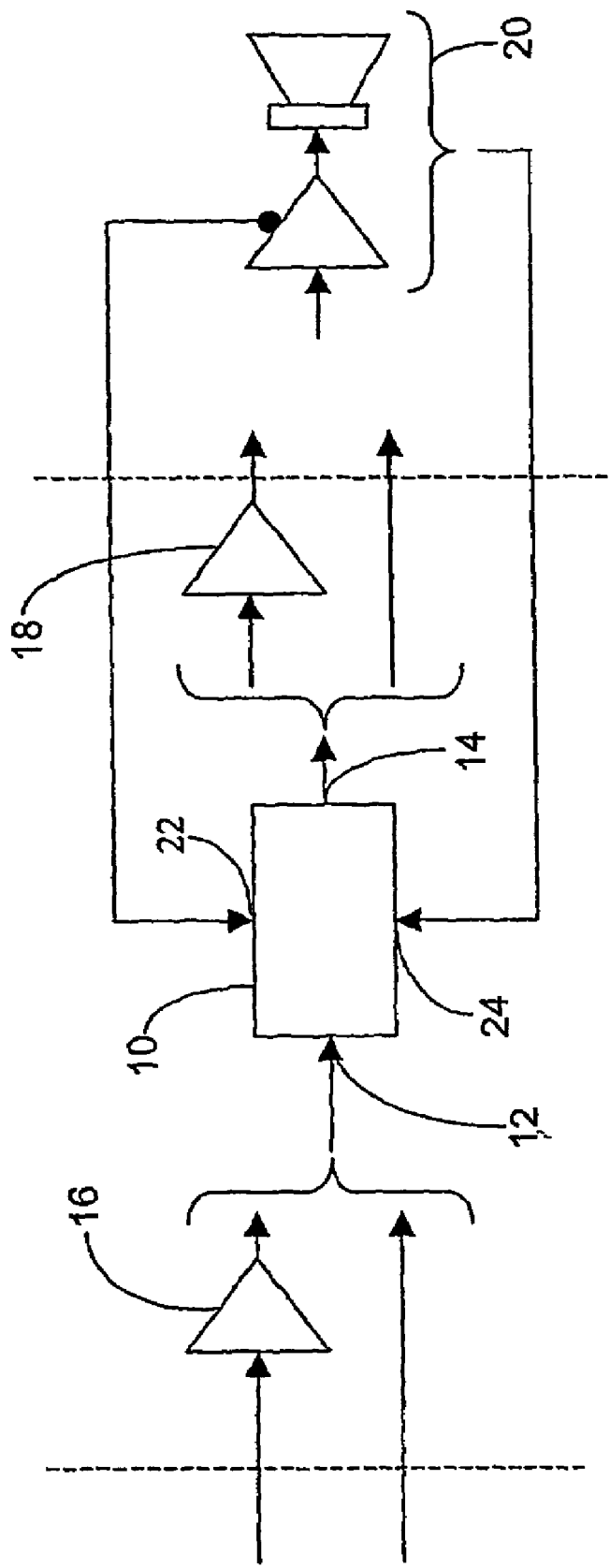
FIG. 1 is a schematic view of a speech transmission system including an embodiment of a system for controlling potentially harmful signals in a signal according to the present invention.

Referring to FIG. 1, a speech transmission system is shown including a system 10 for controlling potentially harmful signals in a signal arranged to convey speech. The system 10 is arranged to receive a digitally encoded signal at input 12. The system is arranged to produce a digitally encoded output signal at output 14. The system 10 is arranged so that the sampling rate for processing the received signal by system 10 is equal to the sampling rate of the received signal which is typically a sample rate of 8,000 samples per second. Those skilled in the art will appreciate that some processing of the received signal may be performed at lower sampling rates with minimal compromise to the signal processing quality provided that appropriate steps are taken to minimise aliasing.

The system 10 is optionally coupled to analogue to digital converter 16 for receiving analogue signals and digital to analogue converter 18 for producing analogue output signals.

The system 10 optionally receives feedback from sound reproduction stage 20. This feedback includes a post processing volume control setting signal at input 22 and a transfer function from digital levels to acoustic levels signal at input 24.

Figure 2:
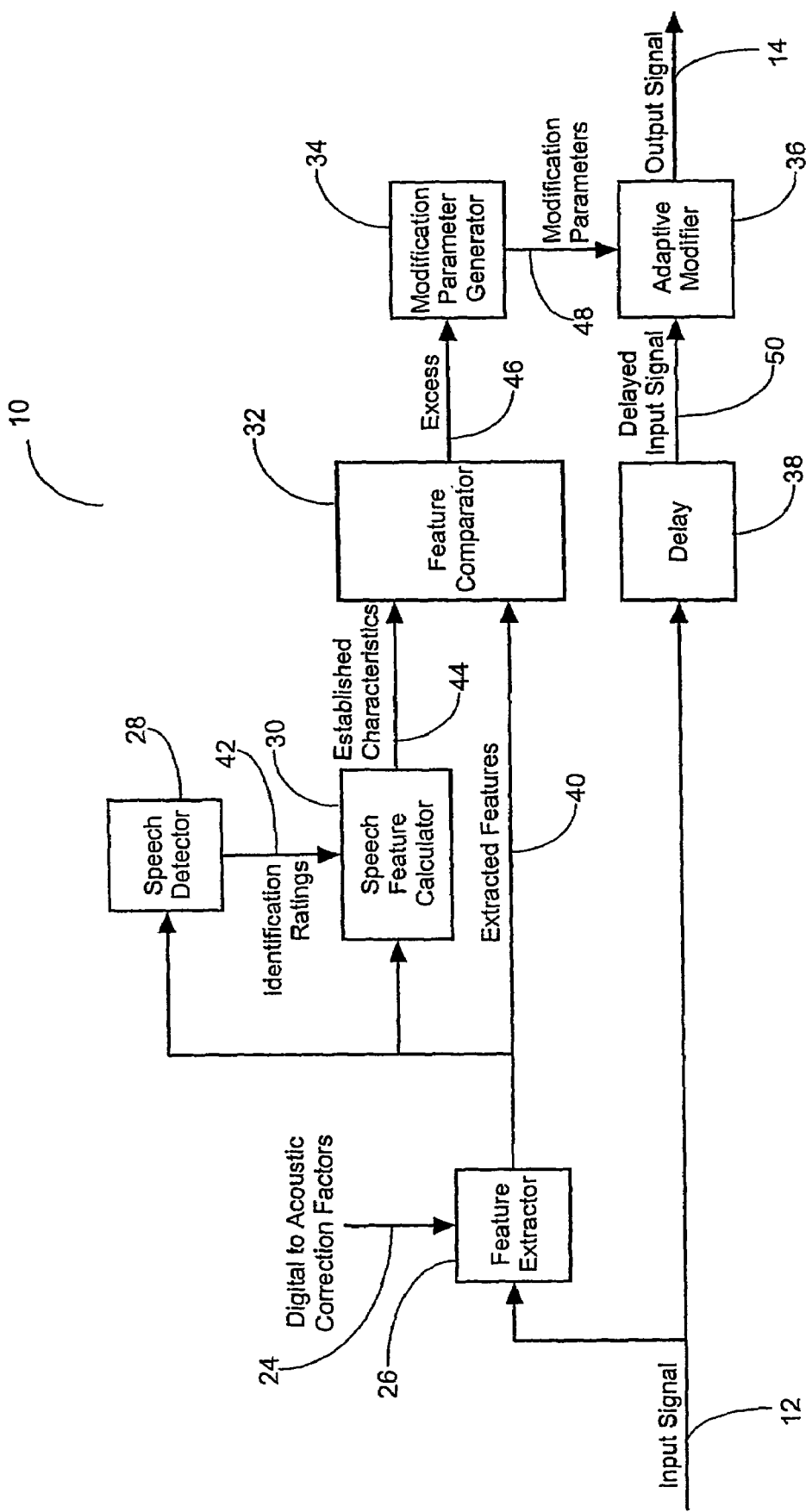
FIG. 2 is a detailed schematic view of the system 10 of FIG. 1.

Referring to FIG. 2 a detailed schematic of system 10 of FIG. 1 is shown. In this example, the system 10 is embodied in software controlling digital signal processing hardware. FIG. 2 shows the functional blocks of the system 10. System 10 includes establishing means made up of feature extractor 26, speech detector 28 and speech feature calculator 30. The system further includes monitoring means in the form of feature comparator 32 in combination with feature extractor 26 and control means in the form of modification parameter generator 34 and adaptive modifier 36.

In operation, system 10 receives a digital signal arranged to convey speech at input 12. Feature extractor 26 operates to extract and store features of the signal, hereinafter referred to as the extracted features 40. Depending upon the nature of encoding of the received signal, this step may include decoding the signal from an encoded format.

The features extracted by feature extractor 26 are passed to speech detector 28 which analyses the extracted features to determine whether they belong to speech. Those skilled in the art will be aware of many techniques available to analyse a signal and determine the character of the signal such as determining if speech is present and dominant in either specific frequency regions of the signal or in the broad band signal. These techniques typically involve statistical analysis of the results of pattern matching the characteristics of the signal with known characteristics. These techniques can produce identification rating of the presence of given signal types in a binary or multi-level form. Such techniques include artificial neural networks, principal component analysis and fuzzy logic applied to parameters derived from the signal using techniques such as short-term frequency analysis, short-term cepstral analysis and linear predictive analysis. If the extracted features are determined to belong to speech then speech detector 28 instructs speech feature calculator 30 to add these features to a record of established characteristics by sampling the extracted features and storing them in a buffer as will be later more fully described.

In parallel to the above described speech detection operation, the extracted features 40 of the signal are compared with the established characteristics 44 by feature comparator 32. If the extracted features 40 of the signal exceed the established characteristics 44 then details of the differences are passed to modification parameter generator 34. Modification parameter generator generates the parameters needed to instruct adaptive modifier 36 to control the signal.

The input signal 12 is passed to adaptive modifier 36 via a delay 38. The delay 38 compensates for the finite time required for the above mentioned feature extraction, feature comparison and modification parameter generation. The modified signal from the adaptive modifier is passed to the output 14. Adaptive modifier 36 may be controlled to provide broad band attenuation as well as frequency selective attenuation. In one form the adaptive modifier 36 is an adaptive filter, such a filter can be instructed to attenuate signal components in specific frequency regions. Those skilled in the art will be aware of many methods to adaptively filter a signal including adaptive IIR filters, adaptive FIR filters, IIR filter bank analysis followed by adaptive modification of the amplitude within the bands and reconstructive synthesis, FIR filter bank analysis followed by adaptive modification of the amplitude within the bands and reconstructive synthesis, discrete Fourier analysis followed by adaptive modification of the complex spectrum and inverse discrete Fourier analysis with reconstruction using techniques such as over-lap add or over-lap save.

If the input signal 50 to the adaptive modifier is in a format other than linear pulse code modulated discrete time samples then it may be converted to this format for modification. Alternatively, it may be controlled by being modified directly in its encoded form such as direct modification applied to the linear predictive coefficients and residuals.

The system is provided with stored pre-determined established characteristics of a signal. These stored characteristics are used upon powering up the system.

Figure 3:
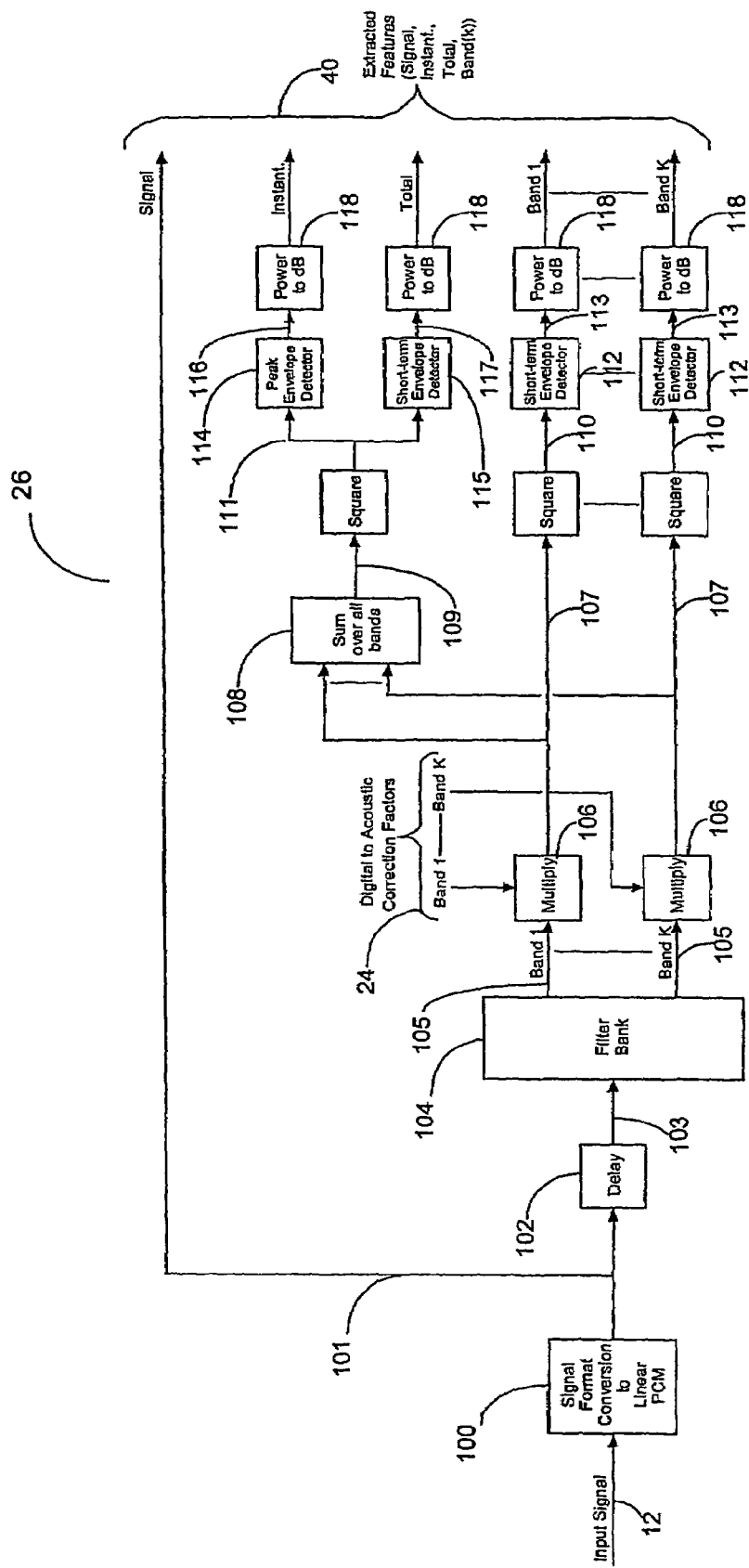
FIG. 3 is a detailed schematic view of the Feature Extractor 26 of FIG. 2.

Referring to FIG. 3 a more detailed schematic of the feature extractor 26 of FIG. 2 is shown. The input signal 12 to the feature extractor is converted to linear pulse code modulated discrete time samples if not already in this format by the process signal format conversion to linear PCM 100. Those skilled in the art will be aware of alternative digital encoding formats including delta modulation, adaptive delta pulse code modulation, linear predictive coding, $\mu$ law coding, A law coding, G711 coding, and code excited linear predictive coding and methods of converting signals in these formats to linear pulse code modulated discrete time samples.

The format converted signal 101 is passed to Delay 102 and to the speech detector 28. The delay compensates for the finite time required for the above mentioned speech detection to be performed. The delayed signal 103 is passed to a filter bank 104. The filter bank splits the signal into a number (K) of frequency bands. The centre frequencies and bandwidth of these bands are selected to approximate the frequency analysis performed by the human cochlea. In one form the centre frequencies of the bands are spaced at third octave intervals. The bandwidth of each band is equal to a third of an octave of the band's centre frequency. Other centre frequencies and bandwidths may be employed such as those based on the critical band, CB scale or the equivalent rectangular bandwidth, ERB scale. Those skilled in the art will be aware of many techniques to achieve separation of the signal into a number of frequency bands including IIR filter banks, FIR filter banks, wavelets and discrete Fourier analysis.

The band signals 105 are weighted by digital to acoustic correction factors 24 by multipliers 106 to produce corrected band signals 107. The frequency dependent correction factors are the measured digital to acoustic transfer function 24 at the corresponding band centre frequencies plus correction factors for any unaccounted ear canal response in the measurement and middle ear response. In the absence of these measured transfer data the correction factors may come from estimated data. The correction factors are chosen to compensate for the effects of the sound reproduction stage 20 (FIG. 1) in combination with the ear and the middle ear so as to approximate the filtering of the signal in the path to the cochlea.

The corrected band signals 107 are combined by summer 108 to produce a total signal 109. The corrected band signals 107 and the total signal 109 are squared to produce band power signals 110 and total power signal 111 respectively. The band power signals are applied to short-term envelope detectors 112 to produce band envelopes 113. These detectors are designed to approximate the short-term perception of frequency specific loudness produced by the auditory system. Averaging the signal over the short-term using a method known as a "leaky integration" provides short-term envelope detection. The attack and release time constants of the "leaky integration" are typically 50 to 150 milliseconds.

One form of short-term envelope detection is a $1^{st}$ order IIR low pass filter with switchable coefficients. The coefficients determine the time constants and are switched depending on whether the input sample to the envelope detector is greater than or equal to the previous envelope sample calculated. If the input sample is greater than or equal to the previous calculated envelope sample then an attack coefficient and its corresponding input scaling factor are selected to be the A1 and B0 coefficients of the filter respectively, where B0=1−A1. Otherwise a release coefficient and its corresponding input scaling factor are selected to be the A1 and B0 coefficients of the filter respectively. The envelope signal resulting from the "leaky integrator" increases exponentially at a rate determined by the attack coefficient when the input sample is greater than or equal to the previous calculated envelope sample. Otherwise the envelope decreases exponentially at a rate determined by the release coefficient.

The total power signal 111 is applied to two envelope detectors, a peak envelope detector 114, and a short-term envelope detector 115, to produce a peak envelope 116 and a total envelope 117. The envelope detectors 114,115 are identical to the short-term envelope detectors described above except that the peak envelope detector employs faster time constants. The attack and release time constants of the peak envelope detector are typically 1 and 20 milliseconds respectively.

The peak envelope 116, the total envelope 117 and the band envelopes 113, are converted to decibels by the power to dB converters 118 to produce the extracted features 40 including instantaneous, total and band(k). Those skilled in the art will be aware of several methods to perform this conversion including power series approximation and look up tables.

Figure 4:
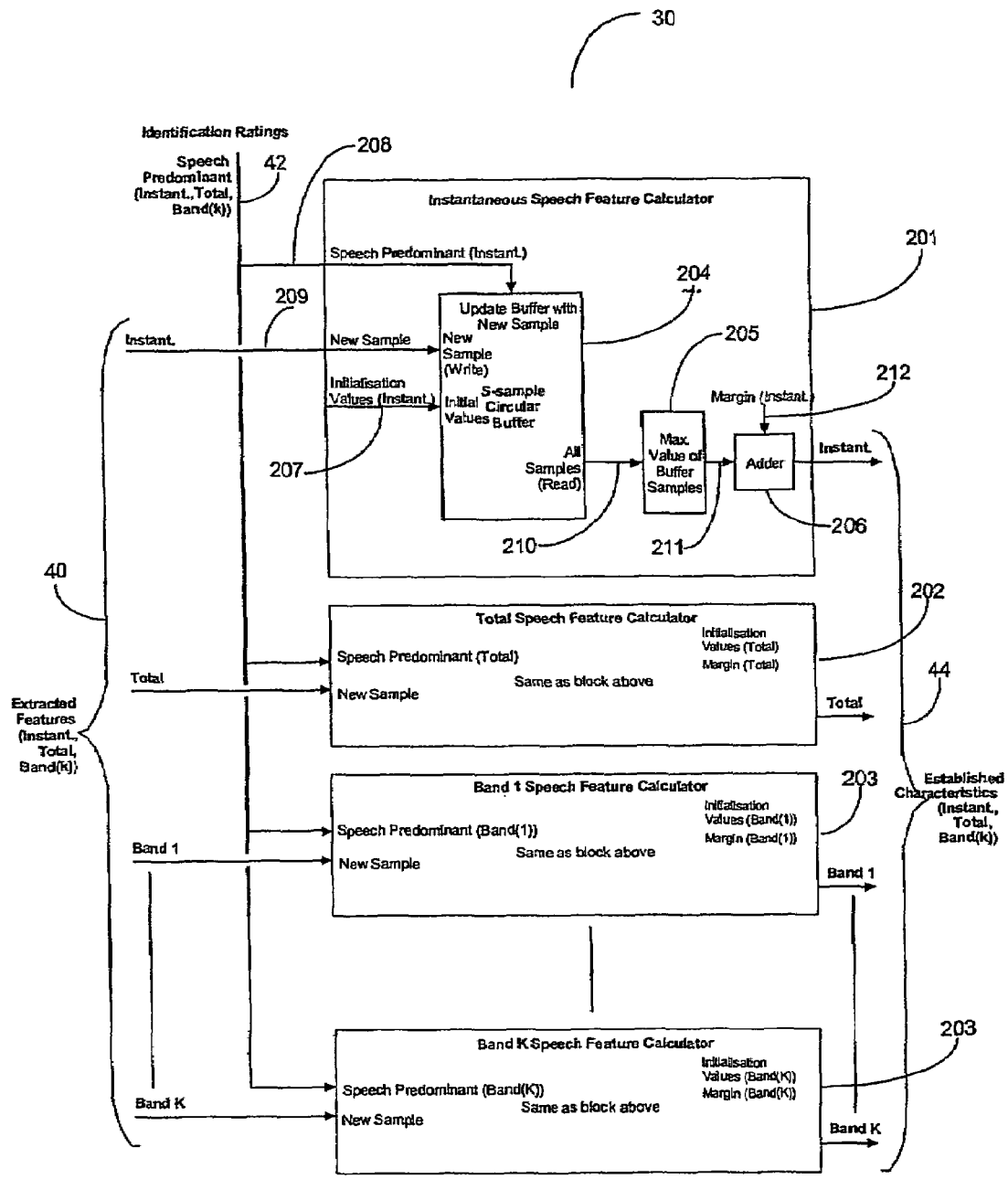
FIG. 4 is a detailed schematic view of the Speech Feature Calculator 30 of FIG. 2.

Referring to FIG. 4 a more detailed schematic of the speech feature calculator 30 (FIG. 2) is shown. The speech feature calculator 30 consists of a bank of individual speech feature calculators, the instantaneous speech feature calculator 201, the total speech feature calculator 202 and K individual band speech feature calculators 203 to calculate the speech features from the instantaneous, total and band(k) extracted features 40.

As each individual speech feature calculator is identical only the instantaneous speech feature calculator 201 will be described. The instantaneous speech feature calculator 201 comprises of an S sample circular buffer 204, where S is the number of samples it contains, a maximum value of buffer samples calculator 205 and an adder 206. The operation of the speech feature calculator will now be described. Upon initialisation, the S sample elements of the circular buffer are established with a set of initialisation values 207 corresponding to those that would be produced by the feature extractor 26 for low level speech.

Control signal 42 is received by speech feature calculator 30 from speech detector 28. Control signal 42 includes a number of individual control signals including the signal speech predominant (instant) 208. The control signal 42 operates to control the storing of extracted features 40 by the speech feature calculator 30. When a control signal has a value of 0 this indicates no speech detected. When the signal has a value of 1 this indicates speech is detected.

With reference to instantaneous speech feature calculator 201, when the control signal speech predominate (instant) 208 is 0 the new sample 209 provided by the feature extractor is ignored. When the control signal speech predominant (instant) 208 is 1, the circular buffer overwrites its oldest sample with the new sample. The maximum value of the buffer samples 211 is calculated by the maximum value of buffer samples process 205 from all the circular buffer samples 210. To this maximum a margin (instant.) 212 is added by adder 206 to produce the established characteristic (instant.), being one of the established characteristics 44.

The accuracy of the human auditory memory of loudness decreases with time, reasonable accuracy typically lasts for several seconds after removal of the stimuli. It is the maximum short-term level within the preceding period that most closely approximates the memory of loudness. The length of the circular buffer is set so that it records the short-term level over a period of several seconds when speech is predominant. Several seconds of speech is adequate to obtain a good record of the typical maximum power features of the speech. The maximum of this recording is taken to approximate the memory of the loudness of speech. If speech is not detected for an extended period the circular buffer samples are overwritten with reduced values to account for the reduction in the accuracy of the human auditory memory with time and the resulting adaptation of the auditory system to lower sound levels. Alternative methods of approximating the memory of the loudness of speech may be employed such as those based on "leaky integration" of the maximum features of the preceding speech.

The purpose of the addition of a margin is to allow for speech not correctly identified by the speech detector but with features exceeding the maximum feature levels of the preceding speech. When set to zero no allowance is made for incorrect identification of speech with features exceeding the maximum feature levels of the preceding speech. While a margin of zero provides good protection an alternative margin typically set to a few decibels provides a good compromise between protection and incorrect modification being applied to speech.

Figure 5:
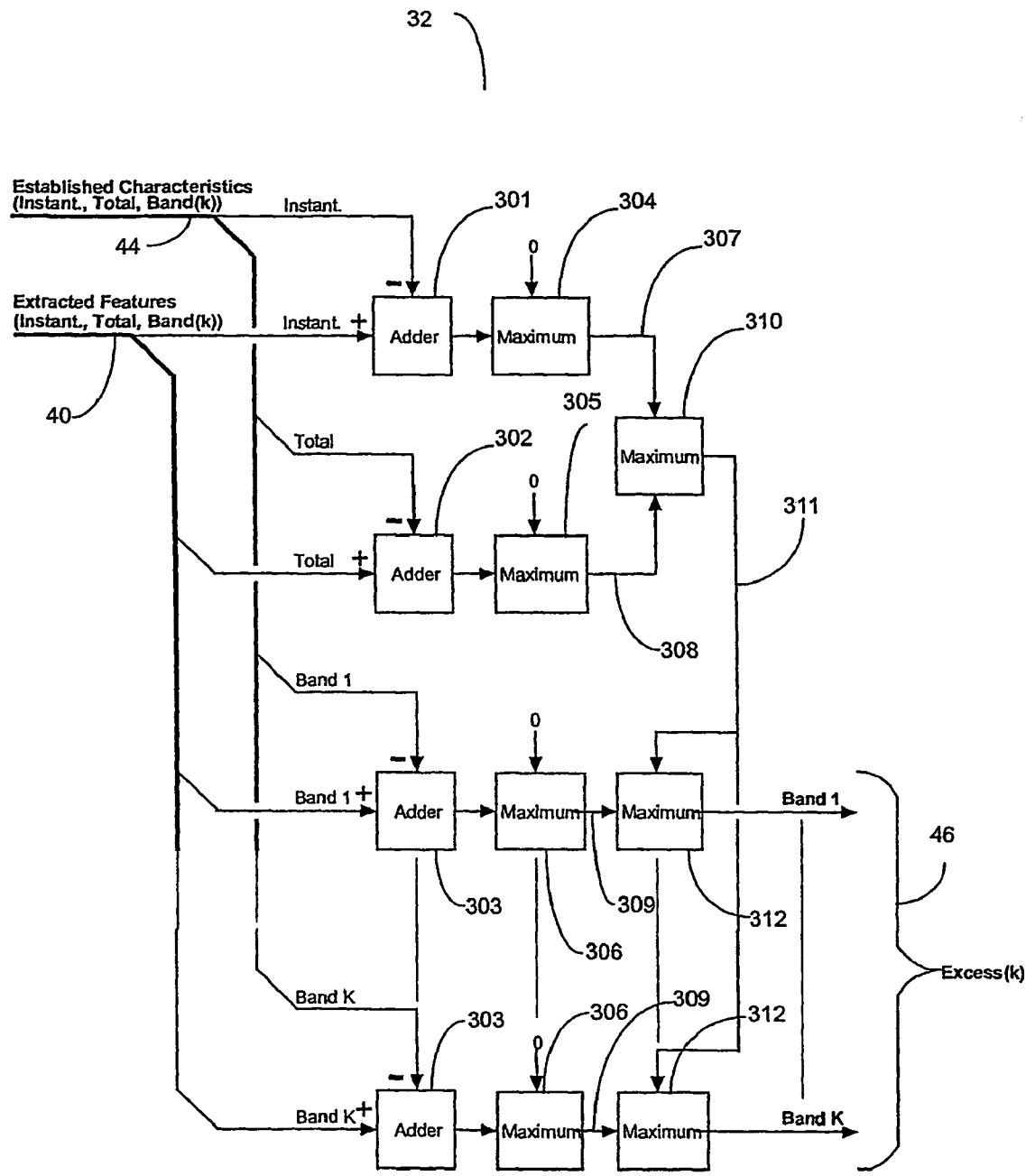
FIG. 5 is a detailed schematic view of the Feature Comparator 32 of FIG. 2.

Referring to FIG. 5 a more detailed schematic of the feature comparator 32 of FIG. 2 is shown. The feature comparator 32 monitors the signal by analysing the extracted features 40 output by feature extractor 26 and comparing these to the established characteristics 44. The feature comparator 32 consists of a bank of subtracters, the instantaneous feature subtracter 301, the total feature subtracter 302 and feature subtracters for the K bands 303. Each subtracter produces the difference between the extracted features 40 and the established characteristics 44 by subtracting the established characteristics 44 from the extracted features 40. The maximum of each resulting difference and 0 is produced by the maximum operations 304, 305, 306 resulting in figures of excess for the instantaneous 307, total 308 and each of the K band 309 features. A maximum of the instantaneous and total excess is obtained by the maximum operation 310. The output of this maximum 311 represents the broad band excess using the two methods. The maximum of the broad band excess 311 and the excess for each band 309 is obtained by a bank of K maximum operations 312 to produce the excess for each of the K bands that incorporates the broad band excess in addition to the frequency specific excess. The band excess represents the amount by which the signal needs to be attenuated in order to remain within the established characteristics.

Figure 6:
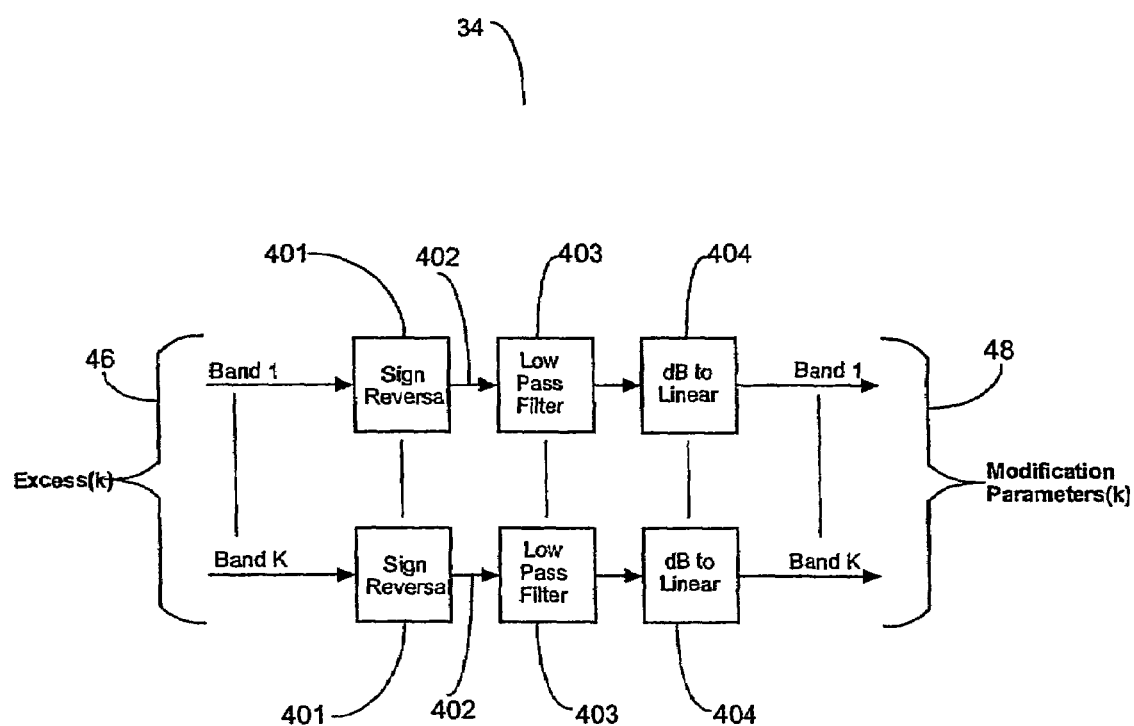
FIG. 6 is a detailed schematic view of the Modification Parameter Generator 34 of FIG. 2.

Referring to FIG. 6 a more detailed schematic of the modification parameter generator 34 of FIG. 2 is shown. The modification parameter generator 34 receives a measure of the excess 46 for each band from the feature comparator. The processing of each band is the same and as such only one band is described. The sign reversal process 401 reverses the sign of band excess from the feature comparator so that the excess in decibels becomes the attenuation in decibels. The attenuation 402 is applied to a low pass filter 403 to smooth out abrupt changes in attenuation which may lead to audible processing artefacts. The dB to linear process 404 converts the output of the low pass filter in decibels to a linear modification parameter 48. These K band modifications parameters 48 are suitable for direct scaling of the amplitude of K band signals within the adaptive modifier. Additional modification parameter generation methods would be needed to suit methods of adaptive modification other than direct scaling of the signal amplitude within the bands or direct scaling of filter coefficients such as when directly modifying linear predictive coefficients.

Figure 7:
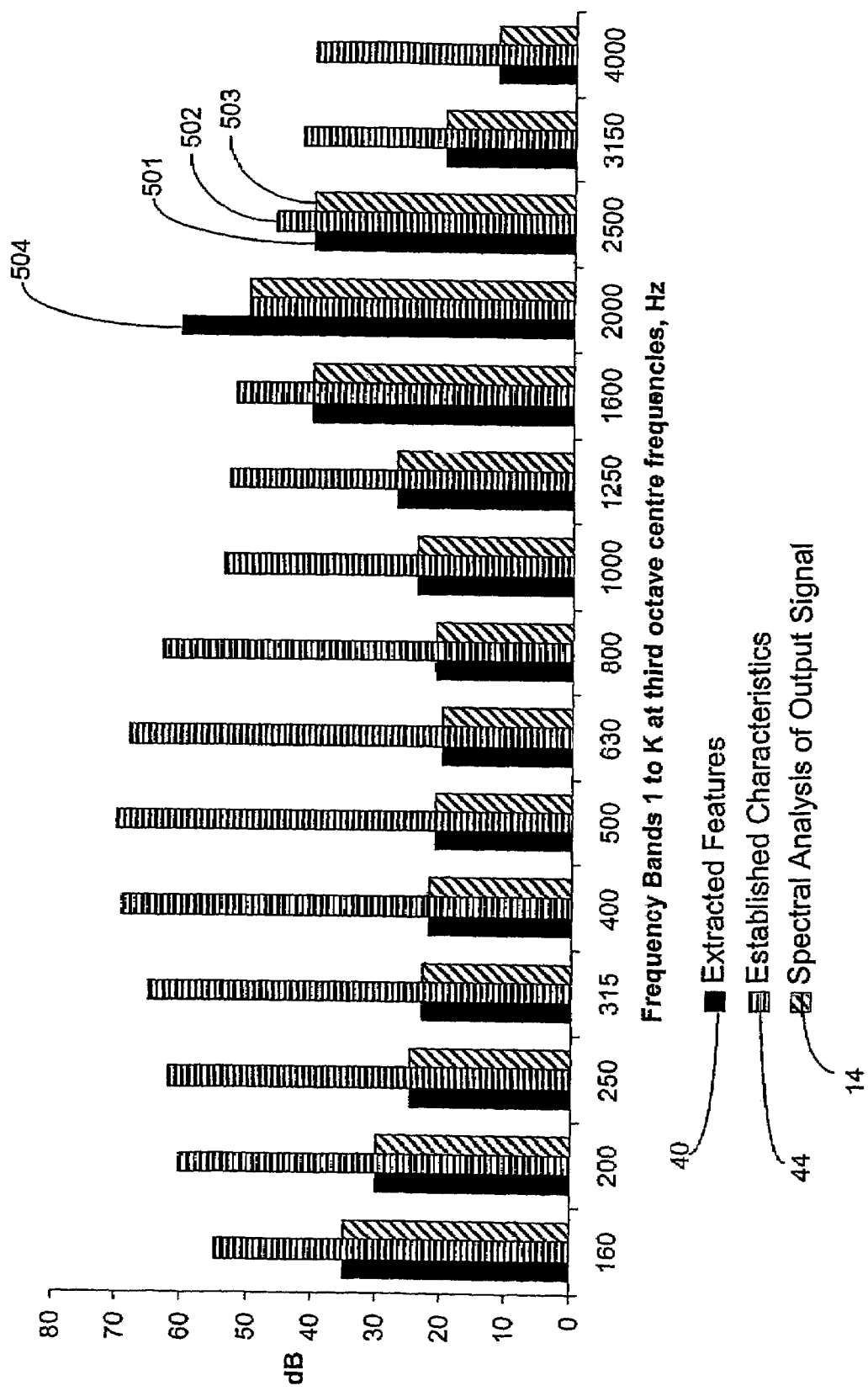
FIG. 7 is a graph illustrating the control over the amplitude of a signal in third octave bands relative to established characteristics by the system of FIG. 2.

Referring to FIG. 7, a graph is shown illustrating the extracted features 501 of the signal 12 received by system 10, the established characteristics 44 generated by system 10 and a spectral analysis of the controlled output signal 14 of system 10. The extracted features 40 displayed are the short-term power levels in third octave bands. The established characteristics 44 displayed are the maximum short-term power levels in third octave bands sampled during preceding periods totalling five seconds in which speech was dominant. It can be seen from the extracted features 40 that the input signal 12 features a peak 504 in the 2 kHz band such as could be produced by a facsimile machine tone which could be potentially harmful to the listener. In the 2,000 Hz band the potentially harmful signal level exceeds the established characteristics 44, being the maximum short-term speech level to which the listener is accustomed, by 10 dB. System 10 attenuates the signal in this frequency band by the amount by which it exceeds the established characteristics. Thus the potentially harmful signal in the 2,000 Hz band is attenuated to a level substantially the same as the established characteristic 44 for that frequency band. Given that a listener will have adjusted the volume control on their sound reproduction equipment for comfortable listening of speech, the attenuated potentially harmful signal present in the controlled output signal is less likely to alarm or shock the listener. This is because its band specific short-term level does not exceed the maximum band specific short-term level of speech to which the listener is recently accustomed to hearing.

Figure 8:
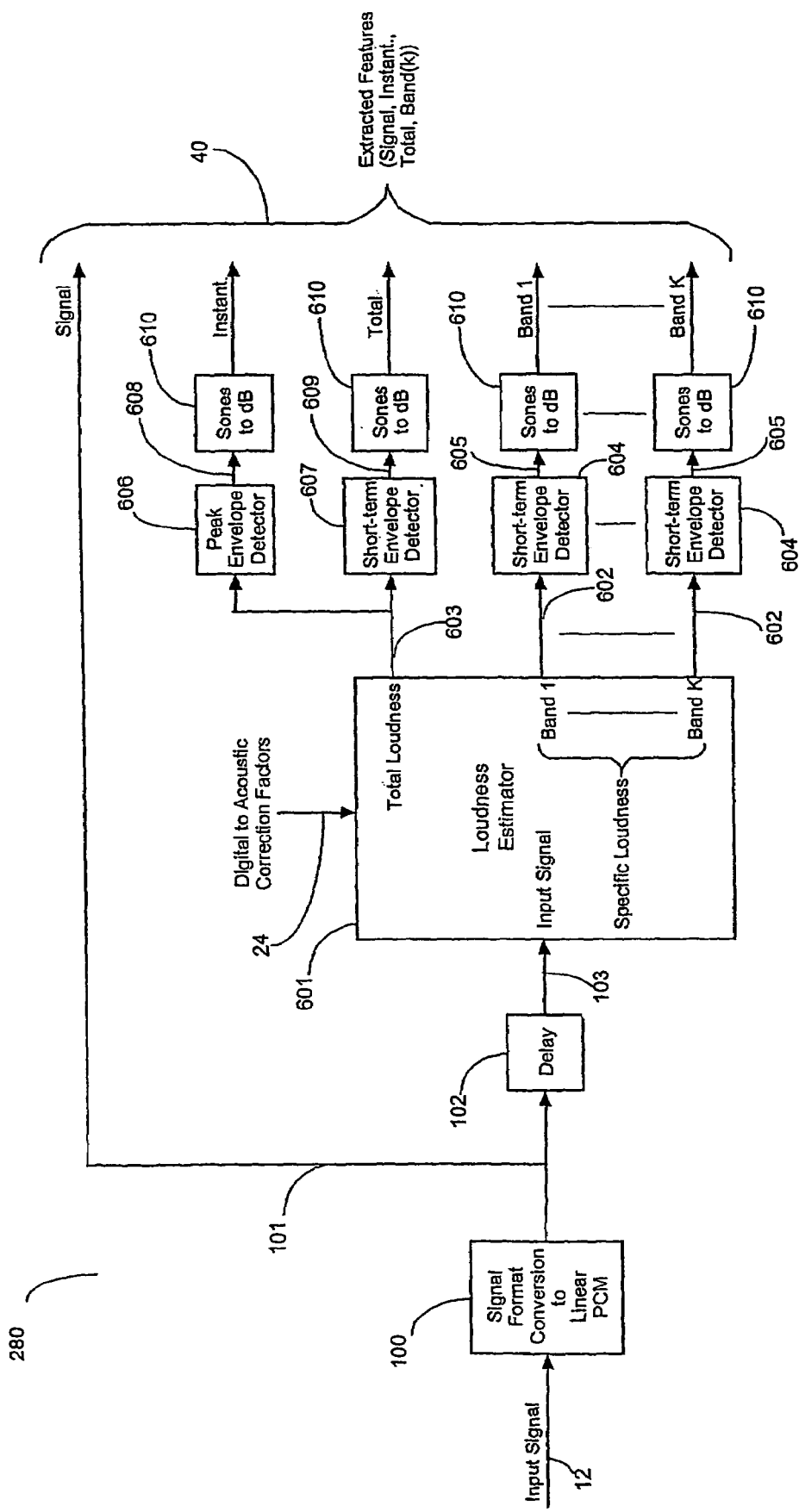
FIG. 8 is a detailed schematic view of a second embodiment the Feature Extractor 26 of FIG. 2.

FIG. 8 illustrates an alternative embodiment 280 of the feature extractor 28 shown in FIG. 3. The signal processing performed by the operations 100 and 102 are identical to those in FIG. 3. The signals present at 101 and 103 are identical those in FIG. 3. Those skilled in the art will be aware of several methods to perform specific and total loudness estimation in sones from a digital signal. These methods can provide estimates of specific and total loudness on a near instantaneous basis as well as short-term total loudness estimates. The loudness estimator 601 shown in FIG. 8 provides specific loudness estimates 602 and total loudness estimates 603. Both of these loudness estimates are in units of sones and estimated on a near instantaneous basis from the digital signal 103 provided to its input along with measured or estimated digital to acoustic correction factors 24. These correction factors are used by the loudness estimator to arrive at an estimate of the spectral content of the signal at the eardrum.

The specific loudness signals 602 are applied to short-term envelope detectors 604, which are identical to the short-term envelope detector 112 in FIG. 3, to produce short-term specific loudness measures 605. These detectors are designed to approximate the short-term perception of frequency specific loudness produced by the auditory system. The time constants are similar as those employed by the short-term envelope detectors 112 in FIG. 3.

The total loudness signal 603 is applied to two envelope detectors, a peak loudness envelope detector 606, and a short-term loudness envelope detector 607, to produce a peak loudness estimate 608 and a total short-term loudness estimate 609. The envelope detectors 606,607 are identical to the envelope detectors 114 and 115 in FIG. 3 in structure and employ similar time constants.

The peak loudness 608, the total short-term loudness envelope 609 and the band specific short-term loudness 605 are converted to decibels by the sones to dB converters 610 to produce the extracted features 40, instantaneous, total and band(k) respectively. Those skilled in the art will be aware of several methods to perform this conversion including power series approximation and look up tables.

Figure 9:
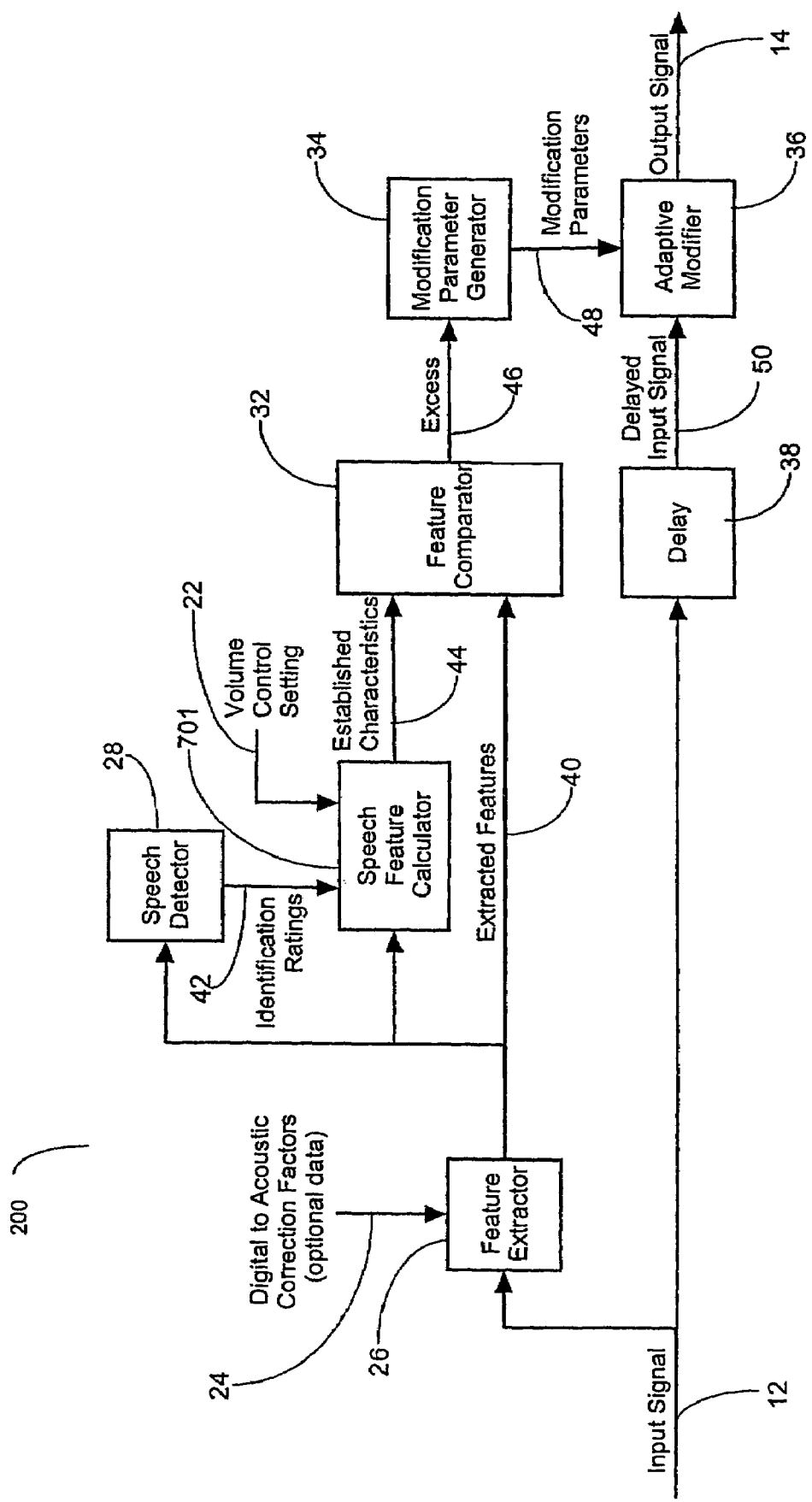
FIG. 9 is a detailed schematic view of a second embodiment of the system 10 of FIG. 1.

A second embodiment of a system according to the invention, which includes processing dependent on feedback in the form of a post processing volume control setting, will now be described. Referring to FIG. 9, a system 200 is shown for reducing potentially harmful signals in a signal arranged to convey speech. The description of FIG. 2 given for the first embodiment applies generally to this embodiment, but this embodiment differs from the embodiment shown in FIG. 2 in that the system 200 receives feedback in the form of a post processing volume control setting at input 22 which it uses to control the established characteristics 44. If the post processing volume control setting is increased from its established position then the established characteristics of speech are similarly reduced. This causes the signal to be maintained within the established characteristics of speech at the output of the post processing volume control such that the signal is controlled relative to the last speech levels experienced by the listener despite the volume control setting being increased. Hence added protection from potentially harmful signals is achieved for conditions where the volume control setting is increased. FIG. 3 and FIGS. 5 to 9 and their detailed descriptions equally apply to this embodiment. System 200 differs from the embodiment shown in FIG. 2 in the implementation and operation of the Speech Feature Calculator 701 which receives the volume control setting 22.

Figure 10:
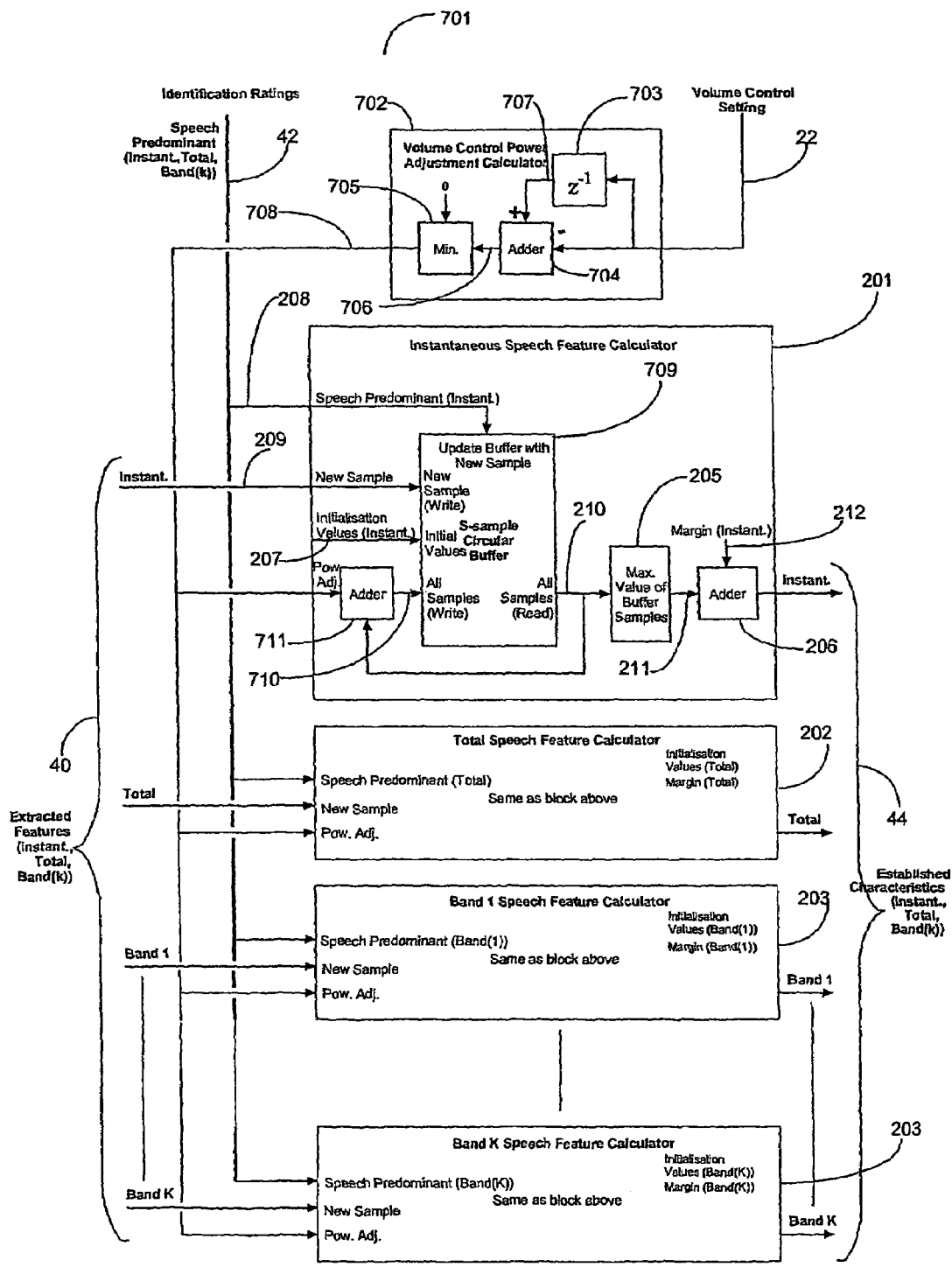
FIG. 10 is a detailed schematic view of the Speech Feature Calculator 701 of FIG. 9.

Referring to FIG. 10 a more detailed schematic of the speech feature calculator 701 is shown. This is an enhanced form of the speech feature calculator shown in FIG. 4. The detailed description of the speech feature calculator 701 is identical to that given for FIG. 4 with the exception of aspects related to the added volume control setting 22 which will now be described.

Volume control setting 22 is a digital discrete time signal representing the volume control setting in units of decibels. The volume control power adjustment calculator 702 comprises of a unit sample delay 703, an adder 704 and a minimum function 705. The operation of the volume control power adjustment calculator will now be described. The sign reversed change in the volume control setting between samples 706 is generated by subtracting the volume control setting 22 from the previous volume control setting 707 produced by the unit sample delay 703. The minimum function 705 produces the minimum of the sign reversed change in the volume control setting between samples 706 and 0 to produce the power adjustment 708. The operation is such that if the volume control setting 22 is reduced or remains constant then the power adjustment 708 is 0 decibels. If the volume control setting 22 is increased then the power adjustment 708 is decreased by an equal amount in decibels.

All of the individual speech feature calculators, instantaneous 201, total 202 and the K bands 203 are of identical form and therefore only the instantaneous 201 speech feature calculator will be described. The S sample circular buffer 709 differs from the S sample circular buffer 204 in FIG. 4 in that all samples are simultaneously over written every sampling period from samples provided at the all samples (write) input 710. The samples for writing are provided by the adder 711. The adder 711 comprises of a bank of S adders, one for each sample within the S sample circular buffer. The adder 711 adds to the outputs of the circular buffer 210 to the power adjustment 708 to produce values for the all samples (write) input 710. Thereby the values in the S sample circular buffer are decreased proportional to the increase in the volume control setting. Alternatively, the speech feature calculator 201 and in particular the adder 711 and the S sample circular buffer 709 can be rearranged such that the additions and the updating of the entire contents of the circular buffer only occurs when an increase in the volume control is detected. In all other respects the speech feature calculator 701 is identical to the speech feature calculator 30 of FIG. 4.

Figure 11:
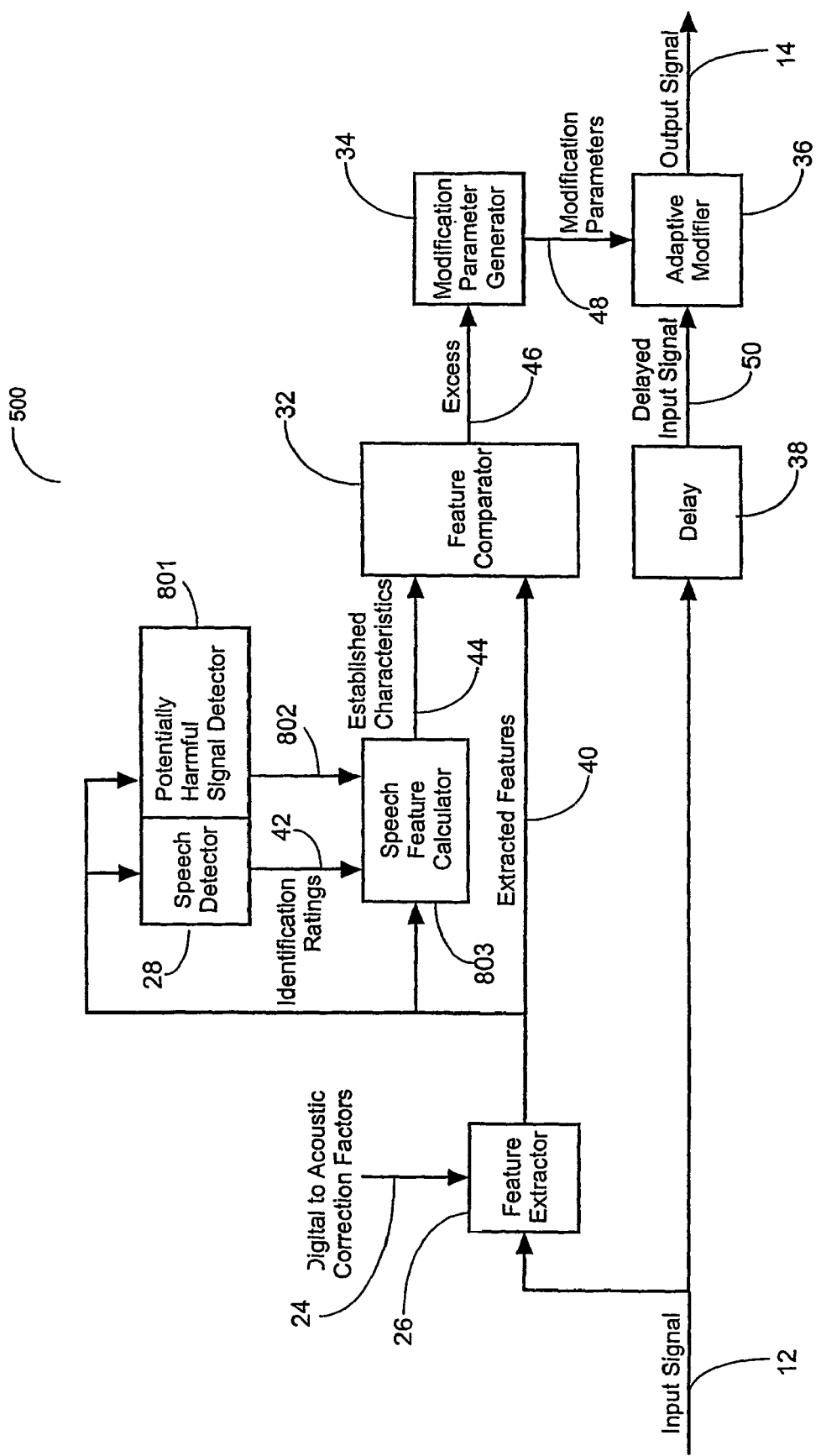
FIG. 11 is a detailed schematic view of a third embodiment of the system 10 of FIG. 1.

A third embodiment of a system according to the present invention, which includes a variation in the established characteristics in response to the probability of potentially harmful signals being present will now be described. Referring to FIG. 11, a system 500 is shown for reducing potentially harmful signals in a signal arranged to convey speech. The description of the FIG. 2 given for the first embodiment applies generally to this embodiment, but this embodiment differs from the first embodiment in that the system 500 includes a modification to the generation of the established characteristics 44 in response to the probability of potentially harmful signals being present. System 500 includes a potentially harmful signal detector 801. The potentially harmful signal detector receives extracted features 40 from the feature extractor 26 and produces a potentially harmful signal identification rating in the form of a probability of potentially harmful signal being present 802 which is used by the speech feature calculator 803 in the generation of the established characteristics. FIG. 3 and FIGS. 5,6 and 8 and their detailed descriptions equally apply to this embodiment.

The operation of the potentially harmful signal detector 801 will now be described. The features extracted 40 by feature extractor 26 are analysed to determine whether they belong to known characteristics of potentially harmful signals. Those skilled in the art will be aware of many techniques available to analyse a signal and determine the character of the signal such as determining if a particular potentially harmful signal type is present and dominant in either specific frequency regions of the signal or in the broad band signal. These techniques typically involve statistical analysis of the results of pattern matching the characteristics of the signal with known characteristics. These techniques can produce identification rating of the presence of given signals types in a binary or multi-level form. Such techniques include artificial neural networks, principle component analysis and fuzzy logic applied to parameters derived from the signal using techniques such as short-term frequency analysis, short-term cepstral analysis and linear predictive analysis. The potentially harmful signal detector 801 produces a potentially harmful signal identification rating 802 in the form of a probability of potentially harmful signals present. Probabilities of potentially harmful signals being present are produced for the instantaneous, total and each of the K band extracted features.

Figure 12:
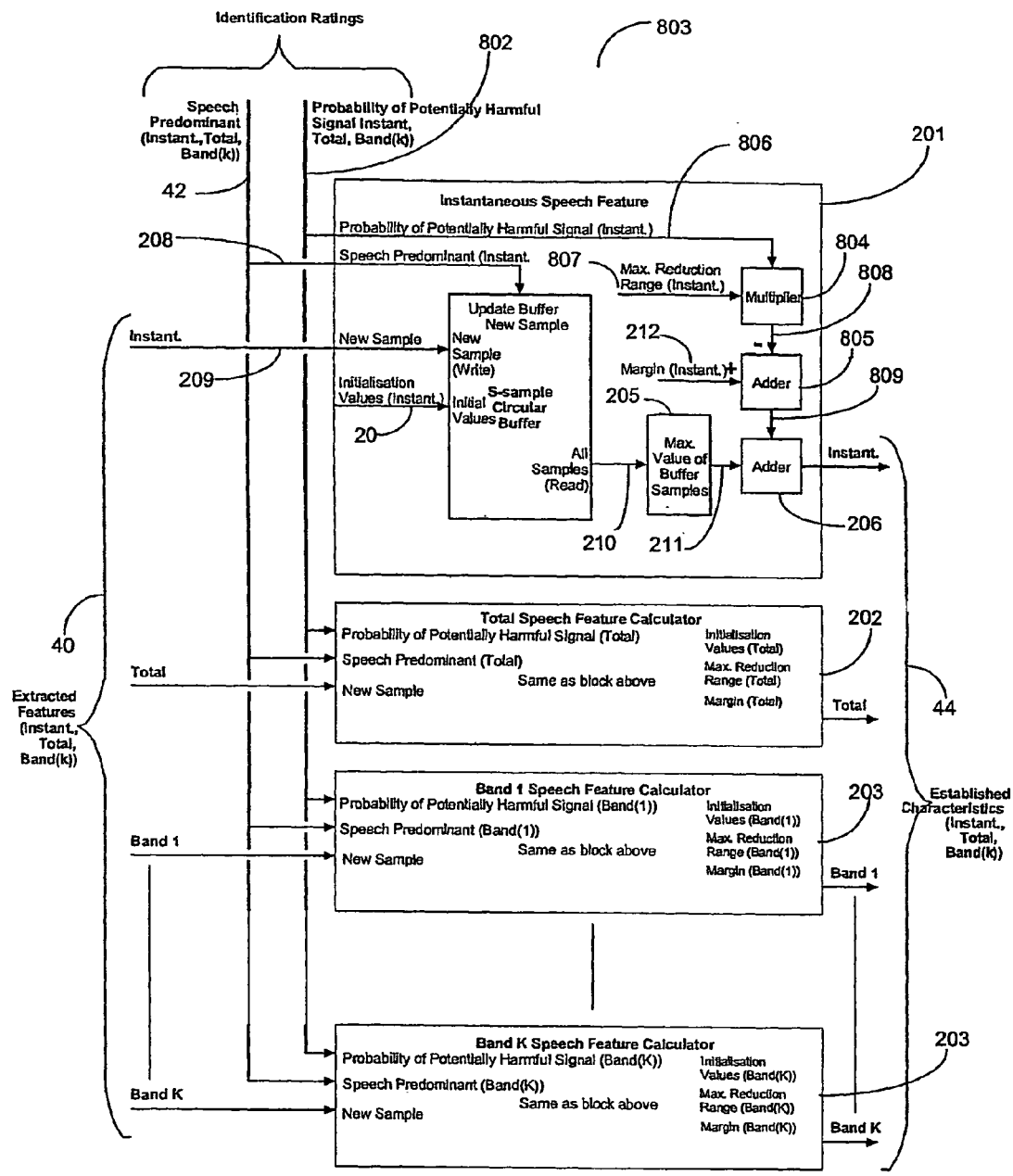
FIG. 12 is a detailed schematic view of Speech Feature Calculator 803 of FIG. 11.

Referring to FIG. 12 a more detailed schematic of the speech feature calculator 803 of FIG. 11 is shown. This is an enhanced form of the speech feature calculator shown in FIG. 4. The detailed description of the speech feature calculator 803 applies generally to that given for FIG. 4 with the exception of aspects related to the establishment of characteristics that are dependent on the probability of potentially harmful signals being present signal 802 which will now be described.

The probabilities of potentially harmful signals being present 802 are received from the potentially harmful signal detector 801. Each probability has a range from 0 to 1, with 0 indicating a low probability of potentially harmful signals being present and 1 indicating a high probability of potentially harmful signals being present. As the operation of the individual speech feature calculators; instantaneous, total and the K bands are essentially the same only the dependence on the probability of potentially harmful signals being present for the instantaneous speech feature calculator 201 will be described. The additional processes are the multiplier 804 and the adder 805. The operation of these processes will now be described. The probability of potentially harmful signals being present (for the instantaneous speech feature calculator) 806 is multiplied by the maximum reduction range 807 by multiplier 804 to produce a reduction factor in decibels 808 that is proportional to the probability of potentially harmful signals being present. The maximum reduction range is typically in the order of 5 to 30 decibels. The adder 805 subtracts the reduction factor in decibels 808 from the margin 212 to produce an offset 809. Adder 206 adds the offset to the maximum values of all the buffer samples 211 to produce the established characteristic 44.

Figure 13:
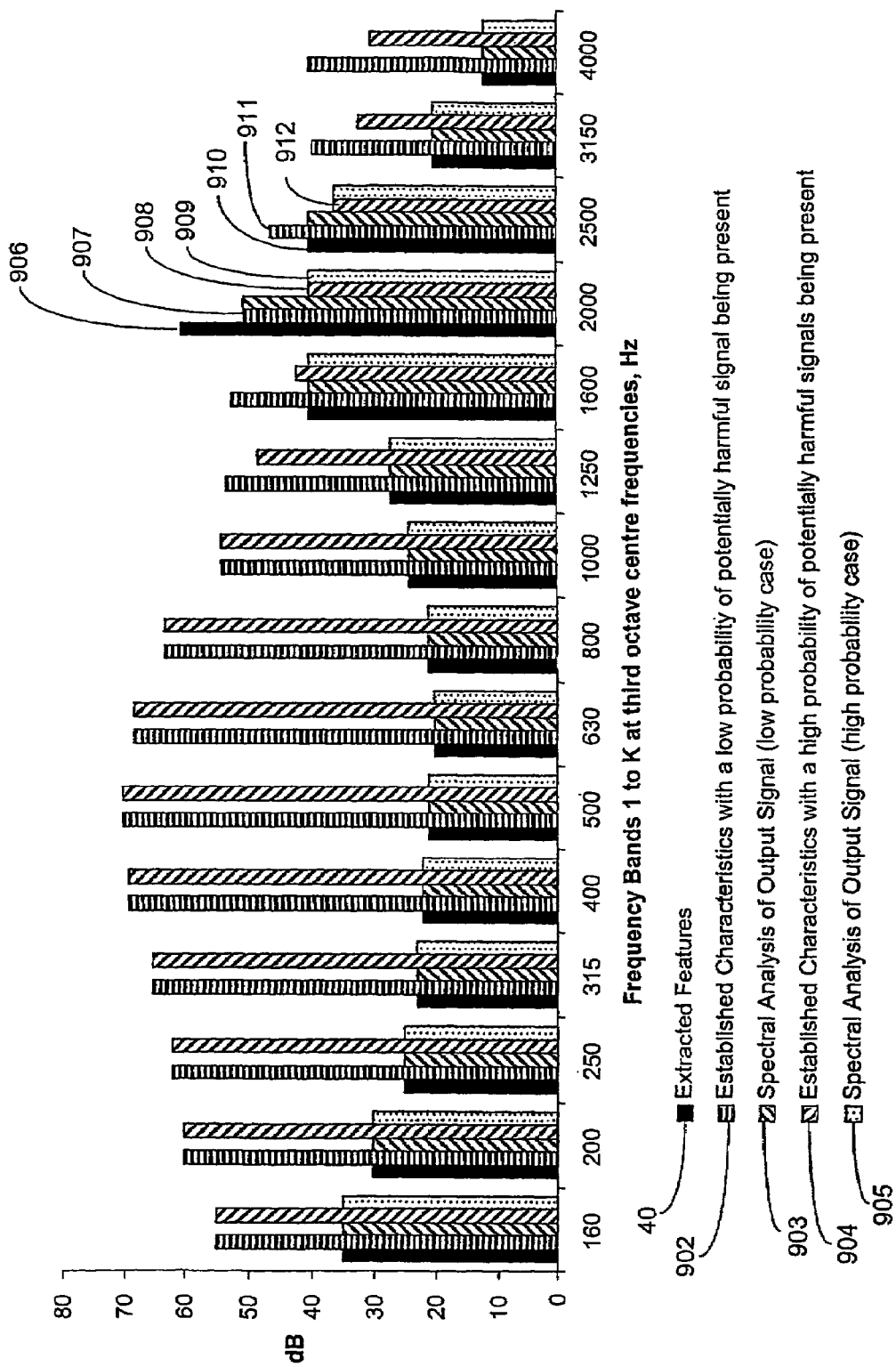
FIG. 13 is a graph illustrating the control over the amplitude of a signal in third octave bands relative to established characteristics by the system of FIG. 11 for low and high probability of potentially harmful signals.

Referring to FIG. 13, a graph is shown illustrating the extracted features 40 of the input signal 12 received by system 500, the established characteristics with low probability of potentially harmful signals being present 902 generated by system 500, a spectral analysis of the controlled output signal 14 of system 500 when a low probability of potentially harmful signals is present 903, the established characteristics with a high probability of potentially harmful signals being present 904 generated by system 500 and a spectral analysis of the controlled output signal 14 of system 500 when a high probability of potentially harmful signals is present 905. The extracted features 40 are illustrated in terms of the short-term power levels in third octave bands. The established characteristics are illustrated in terms of the maximum short-term power levels in third octave bands sampled during preceding periods totalling five seconds in which speech was dominant with the appropriate offsets dependent on the margins selected, the maximum reduction range selected and the probability of potentially harmful signals being present.

It can be seen that the received signal 12 features a peak in the 2,000 Hz band 906 such as could be produced by a facsimile machine tone which could be potentially harmful to the listener. In the 2,000 Hz band the potentially harmful signal level exceeds the established characteristics with low probability of potentially harmful signals 902 to which the listener is accustomed by 10 decibels. System 500 attenuates the signal in this frequency band by the amount by which it exceeds the established characteristics with a low probability of potentially harmful signals being present 902. Thus the potentially harmful signal in the 2,000 Hz band of the spectral analysis of the output signal 905 is at a level substantially the same as the established characteristics with a low probability of potentially harmful signals being present for that frequency 907. The signals in other bands remain unchanged.

When the probability of potentially harmful signals being present is high the established characteristics are reduced as shown by the established characteristics with high probability of potentially harmful signals being present 904. It can be seen that received signal featuring a peak in the 2,000 Hz band exceeds the established characteristic in this band 908 by 20 decibels. System 500 attenuates the signal in this frequency band by the amount by which it exceeds the established characteristics with high probability of potentially harmful signals being present 908. Thus the potentially harmful signal in the 2,000 Hz band of the spectral analysis of the output signal 909 is at a level substantially the same as the established characteristic for a high probability of harmful signals being present for that frequency 908. In this case an extra 10 decibels of protection has been provided at this frequency as a result of a high probability of potentially harmful signals being detected as opposed to a low probability of potentially harmful signals being present in this frequency region.

It can be seen that the extracted feature 40 of the signal in the 2,500 Hz band 910 does not exceed the established characteristics with low probability of potentially harmful signals being present 911. However, it does exceed the established characteristics with high probability of potentially harmful signals being present 912 by a few decibels and is reduced by this amount in the spectral analysis 905 of the output signal 14 by system 500. This figure demonstrates the greater degree of protection provided when the signal being conveyed exhibits properties closer to those of known potentially harmful signals.

Figure 14:
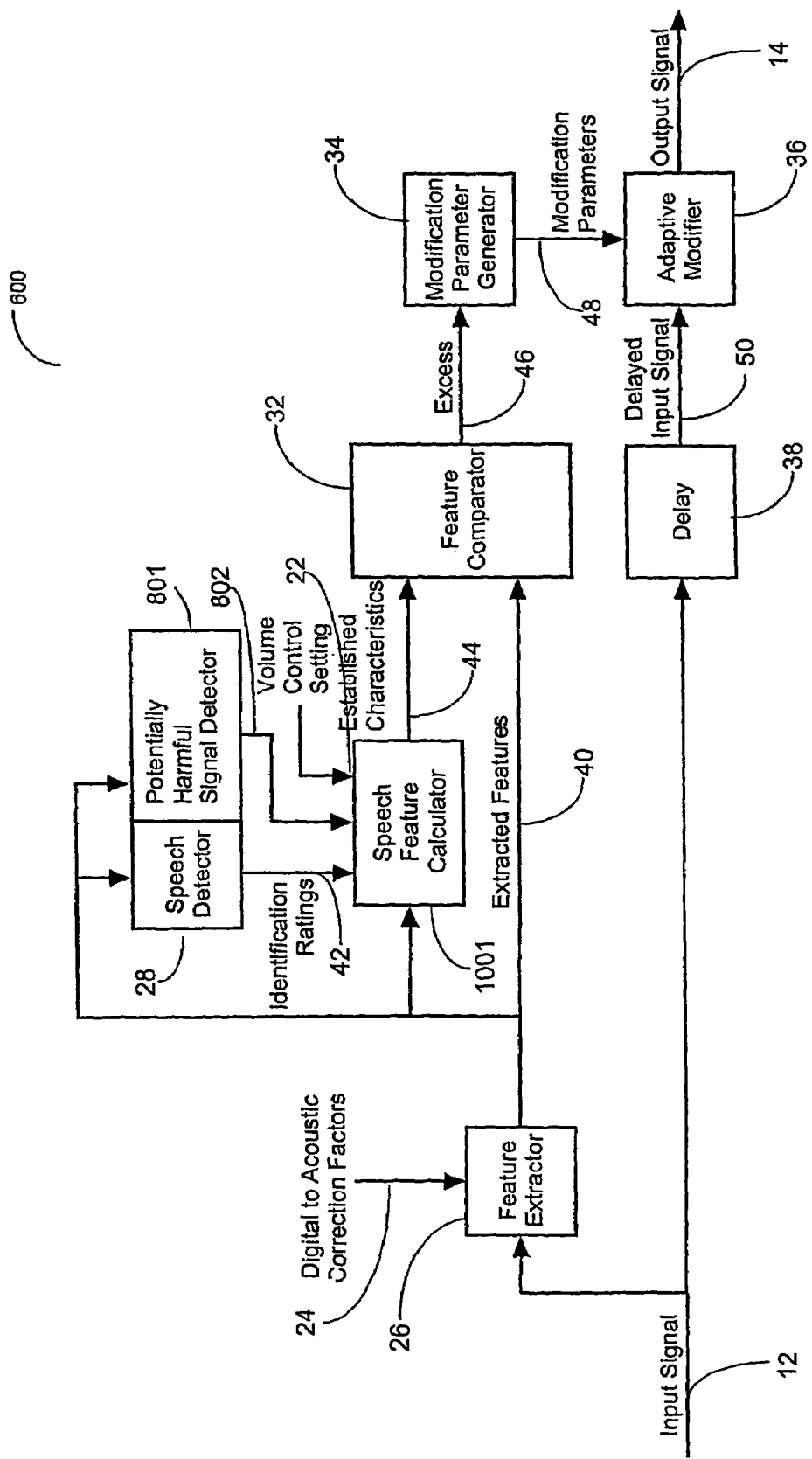
FIG. 14 is a detailed schematic view of a fourth embodiment of the system 10 of FIG. 1.

A fourth embodiment of a system 600 according to the invention is shown in FIG. 14, which includes both processing dependent on feedback in the form of post processing volume control setting 22 and a reduction in the established characteristics in response to the probability of potentially harmful signals being present. The description of FIG. 2 given for the first embodiment generally applies to this embodiment, but this fourth embodiment includes the additions to the first embodiment found in both the second and third embodiments.

Figure 15:
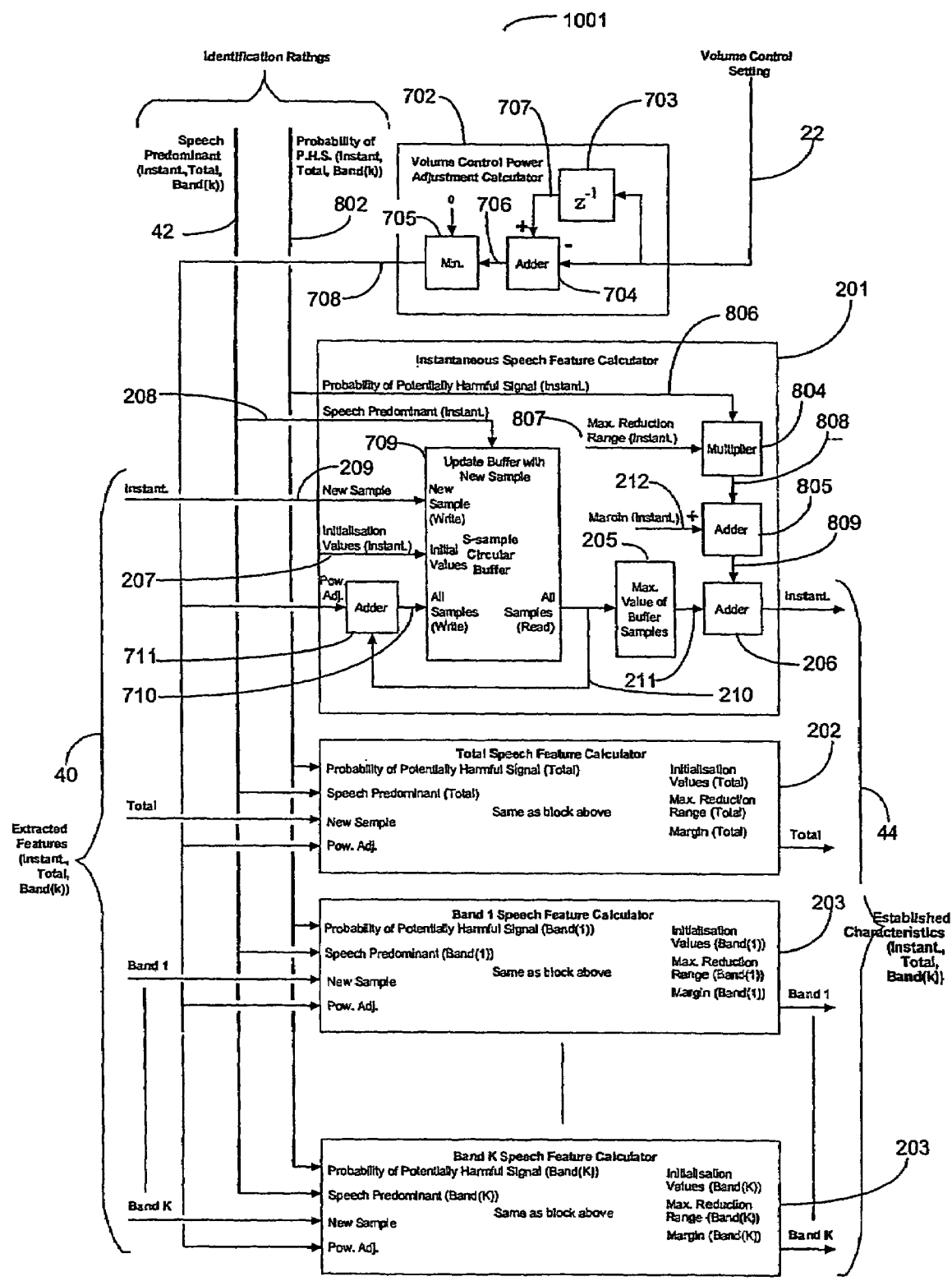
FIG. 15 is a detailed schematic view of the Speech Feature Calculator 1001 of FIG. 14.

Referring to FIG. 15 a more detailed schematic of the speech feature calculator 1001 of system 600 of FIG. 14 is shown. Again, this embodiment of the speech feature calculator includes the additions to the first embodiment found in both the second and third embodiments of the speech feature calculator illustrated in FIGS. 10 and 12.

The above described invention has application in telephone call centres, telephone systems in general including mobile telephone systems, and any application where a signal is converted to sound where the signal may include potentially harmful signals.

The above described embodiments of the invention employ digital signal processing techniques. However, the invention is not limited to these techniques and analogue signal processing techniques may similarly be used.

Those skilled in the art will appreciate that the method of the invention may be conducted using other means than those specifically described above.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

What is claimed is:

1. A method of controlling potentially harmful signals in a signal arranged to convey speech, the method including the steps of:
   analysing the signal to determine at least one feature of the signal;
   analysing the signal to determine when it is conveying a speech signal;
   establishing at least one characteristic of the signal, said established characteristic being based on said at least one feature of the signal determined at times when the signal is determined to be conveying the speech signal;
   comparing said at least one feature of the signal with its corresponding said established characteristic; and
   when said at least one feature of the signal exceeds its corresponding said established characteristic then controlling the signal to reduce the amount by which said at least one feature exceeds its corresponding said established characteristic.

2. A method according to claim 1 wherein said at least one feature includes frequency-specific features determined in a plurality of frequency bands.

3. A method according to claim 2 wherein the step of establishing at least one characteristic of the signal is only carried out when the speech signal is determined to be predominant within the frequency band of the frequency specific feature.

4. A method according to claim 2 wherein the frequency specific features include short-term estimates of power in the frequency bands.

5. A method according to claim 1 wherein the step of establishing at least one characteristic of the signal is only carried out when the speech signal is determined to be predominant within the signal and/or the speech signal is determined to be predominant within the bandwidth of the signal corresponding to that of the characteristic being established.

6. A method according to claim 5 wherein said at least one feature includes frequency specific features determined in a plurality of frequency bands.

7. A method according to claim 6 wherein said frequency specific features include short-term estimates of power in the frequency bands.

8. A method according to any one of claims 1, 2, 3, 4, 5, 6 or 7 wherein at least one said established characteristic is based on the maximum value of said at least one feature of the signal.

9. An article, comprising:
   a computer-readable signal-bearing medium; and
   means in the medium for providing instructions to a computing system to carry out a method according to claim 1.

10. A system for controlling potentially harmful signals in a signal arranged to convey speech, the system including:
    analysing means for analysing the signal to determine at least one feature of the signal;
    analysing means for analysing the signal to determine when it is conveying a speech signal;
    establishing means for establishing at least one characteristic of the signal, said established characteristic being based on said at least one feature of the signal determined at times when the signal is determined to be conveying the speech signal; and
    control means for comparing said at least one feature of the signal with its corresponding said established characteristic, and when said at least one feature of the signal exceeds its corresponding said established characteristic then controlling the signal to reduce the amount by which said at least one feature exceeds its corresponding said established characteristic.

11. A system according to claim 10 wherein said at least one feature includes frequency-specific features determined in a plurality of frequency bands.

12. A system according to claim 11 wherein the establishing means is arranged to establish at least one characteristic of the signal only when the speech signal is determined to be predominant within the frequency band of the frequency specific feature.

13. A system according to claim 11 wherein the frequency specific features include short-term estimates of power in the frequency bands.

14. A system according to claim 10 wherein the establishing means is arranged to establish at least one characteristic of the signal only when the speech signal is determined to be predominant within the signal and/or the speech signal is determined to be predominant within the bandwidth of the signal corresponding to that of the characteristic being established.

15. A system according to claim 14 wherein said at least one feature includes frequency specific features determined in a plurality of frequency bands.

16. A system according to claim 14 wherein said frequency specific features include short-term estimates of power in the frequency bands.

17. A system according to any one of claims 10, 11, 12, 13, 14, 15 or 16 wherein at least one said established characteristic is based on the maximum value of said at least one feature of the signal.

18. An article, comprising:
    a computer-readable signal-bearing medium;
    means in the medium for providing instructions to cause a computing system to operate as a system in accordance with claim 10.

19. A method of controlling the loudness of a signal relative to the loudness of speech within the signal, the method including the steps of:
    analysing the signal to determine at least one loudness feature of the signal;
    analysing the signal to determine when it is conveying a speech signal;
    establishing at least one loudness characteristic of the signal, said established loudness characteristic being based on said at least one loudness feature of the signal determined at times when the signal is determined to be conveying the speech signal;
    comparing said at least one loudness feature of the signal with its corresponding said established loudness characteristic; and
    when said at least one loudness feature of the signal exceeds its corresponding said established loudness characteristic then controlling the signal to reduce the amount by which said at least one loudness feature exceeds its corresponding said established loudness characteristic.

20. A method according to claim 19 wherein said at least one loudness feature includes specific loudness features.

21. A method according to claim 20 wherein the step of establishing at least one loudness characteristic of the signal is only carried out when the speech signal is determined to be predominant within the bandwidth of the specific loudness feature.

22. A method according to claim 20 wherein the specific loudness features include short-term estimates of the power in a plurality of frequency bands.

23. A method according to claim 19 wherein the step of establishing at least one loudness characteristic of the signal is only carried out when the speech signal is determined to be predominant within the signal and/or the speech signal is determined to be predominant within the bandwidth of the signal corresponding to that of the loudness characteristic being established.

24. A method according to claim 23 wherein said at least one loudness feature includes specific loudness features.

25. A method according to claim 24 wherein the specific loudness features include short-term estimates of the power in a plurality of frequency bands.

26. A method according to any one of claims 19 to 25 wherein at least one said established loudness characteristic is based on the maximum value of a said at least one loudness feature of the signal.

27. An article, comprising:
a computer-readable signal-bearing medium; and
means in the medium for providing instructions to a computing system to carry out a method according to claim 19.

28. A system for controlling the loudness of a signal relative to the loudness of speech within the signal, the system including:
analysing means for analysing the signal to determine at least one loudness feature of the signal;
analysing means for analysing the signal to determine when it is conveying a speech signal;
establishing means for establishing at least one loudness characteristic of the signal, said established loudness characteristic being based on said at least one loudness feature of the signal determined at times when the signal is determined to be conveying the speech signal; and
control means for comparing said at least one loudness feature of the signal with its corresponding said established loudness characteristic, and when said at least one loudness feature of the signal exceeds its corresponding said established loudness characteristic then controlling the signal to reduce the amount by which said at least one loudness feature exceeds its corresponding said established loudness characteristic.

29. A system according to claim 28 wherein said at least one loudness feature includes specific loudness features.

30. A system according to claim 29 wherein the specific loudness features include short-term estimates of the power in a plurality of frequency bands.

31. A system according to claim 29 wherein the establishing means is arranged to establish at least one loudness characteristic of the signal only when the speech signal is determined to be predominant within the bandwidth of the specific loudness feature.

32. A system according to claim 28 wherein the establishing means is arranged to establish at least one loudness characteristic of the signal only when the speech signal is determined to be predominant within the signal and/or the speech signal is determined to be predominant within the bandwidth of the signal corresponding to that of the loudness characteristic being established.

33. A system according to claim 32 wherein said at least one loudness feature includes specific loudness features.

34. A system according to claim 33 wherein the specific loudness features include short-term estimates of the power in a plurality of frequency bands.

35. A system according to any one of claims 28 to 34 wherein at least one said established loudness characteristic is based on the maximum value of said at least one loudness feature of the signal.

36. An article, comprising:
a computer-readable signal-bearing medium; and
means in the medium for providing instructions to cause a computing system to operate as a system in accordance with claim 28.

* * * * *